Sept. 20, 1966    L. H. BERMANN    3,274,528
STRAIN MEASURING DEVICE
Filed March 23, 1964    3 Sheets-Sheet 1
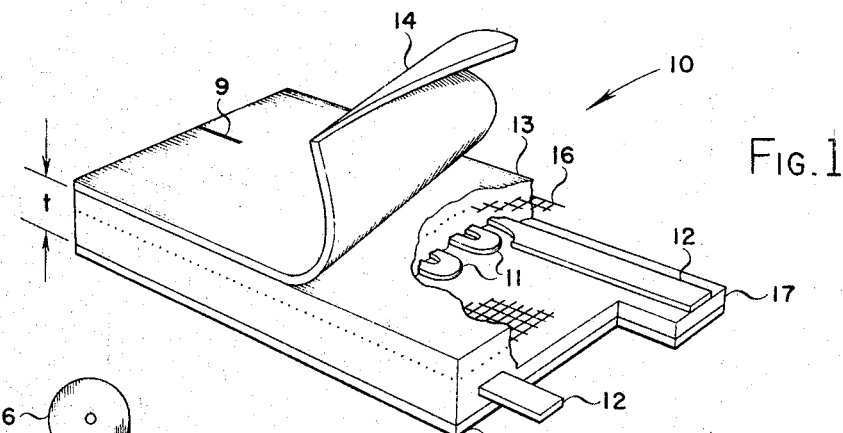
Fig. 1
Fig. 2
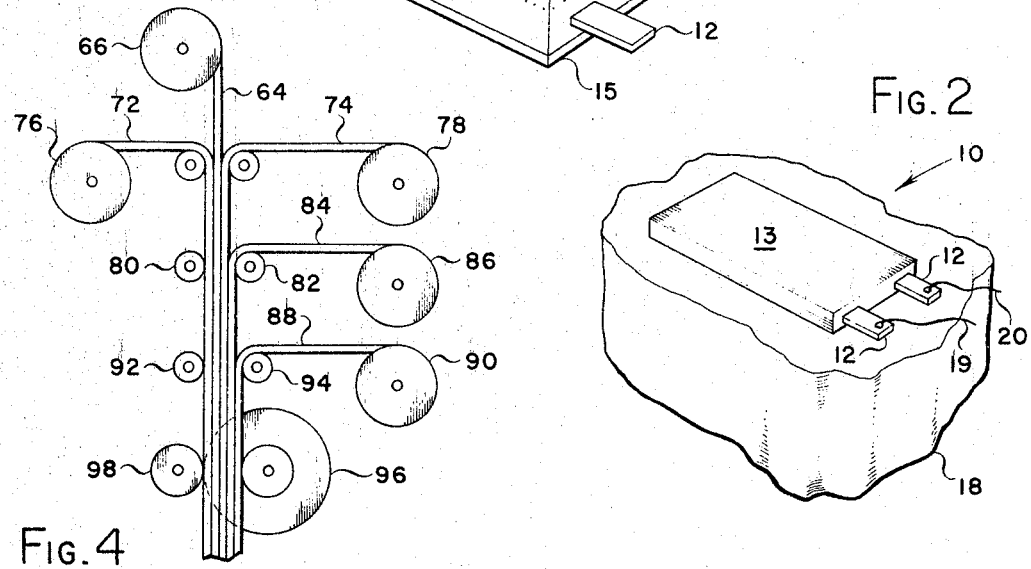
Fig. 4
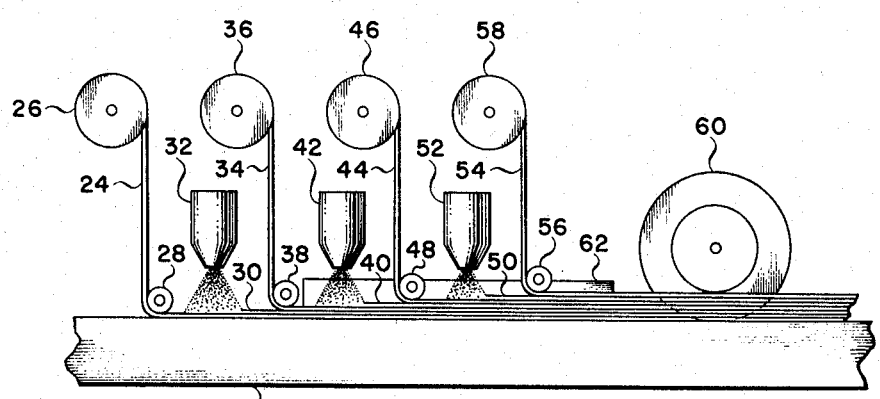
Fig. 3
INVENTOR.
LESLIE H. BERMANN
BY
*George C. Sullivan*
Agent Sept. 20, 1966     L. H. BERMANN     3,274,528
STRAIN MEASURING DEVICE Filed March 23, 1964     3 Sheets-Sheet 2

INVENTOR.
LESLIE H. BERMANN
BY
Agent

Sept. 20, 1966  L. H. BERMANN  3,274,528
STRAIN MEASURING DEVICE
Filed March 23, 1964  3 Sheets-Sheet 3

BACKED GAUGE

MATRIX GAUGE

INVENTOR.
LESLIE H. BERMANN
BY
Agent

United States Patent Office 3,274,528
Patented Sept. 20, 1966

3,274,528
STRAIN MEASURING DEVICE
Leslie H. Bermann, Northridge, Calif., assignor to Lockheed Aircraft Corporation, Burbank, Calif.
Filed Mar. 23, 1964, Ser. No. 353,660
6 Claims. (Cl. 338—2)

This invention relates to instruments for measuring strain and temperature and to methods for fabricating and applying the same.

The more superior gauges of the general nature herein contemplated have heretofore been manufactured and installed as hair-fine wires or leaf-foil. The gauge elements have been difficult to handle without destructive effect thereto. It has been necessary to apply and cure individual coats of adhesive with a resultant consumption of relatively great amounts of time and expense. Additionally, proper application of gauges to structure has required the services of skilled workers in order to assure a quality application.

A primary object of the present invention is to provide a relatively rugged measuring instrument constructed such that the measuring element is integrated into an adhesive matrix, the resulting product capable of being handled and applied by relatively inexperienced personnel without detriment to the instrument. This gauge is sometimes referred to as a matrix gauge.

Another object of invention is to provide a measuring instrument which includes an adhesive matrix capable of adherence to a surface without the use of supplementary adhesives and in which the installation time for application to such surface is minimized.

Another object is to provide a gauge which includes an hermetically sealed detector element.

Yet another object is to provide a measuring instrument having superior qualities of gauge factor, linearity, hysteresis, apparent strain, drift, creep and shear strength over a wide temperature range and having a high factor of uniformity from unit-to-unit.

A further object is to provide instruments for obtaining temperature or strain measurements which, while possessing superior qualities of measurement, are more economical than comparable commercially available units.

The above and other objects of invention will become apparent when considered in view of the following description and the accompanying drawings in which:

FIGURE 1 is a representative illustration of a typical gauge of the invention;

FIGURE 2 is a perspective view of a gauge assembly as typically applied to an adhered surface, backing strips having been removed;

FIGURE 3 is a schematic representation of a series of procedural steps and apparatus for fabricating the gauge;

FIGURE 4 is a schematic representation of an alternative approach for fabricating the gauges;

Figure 5:
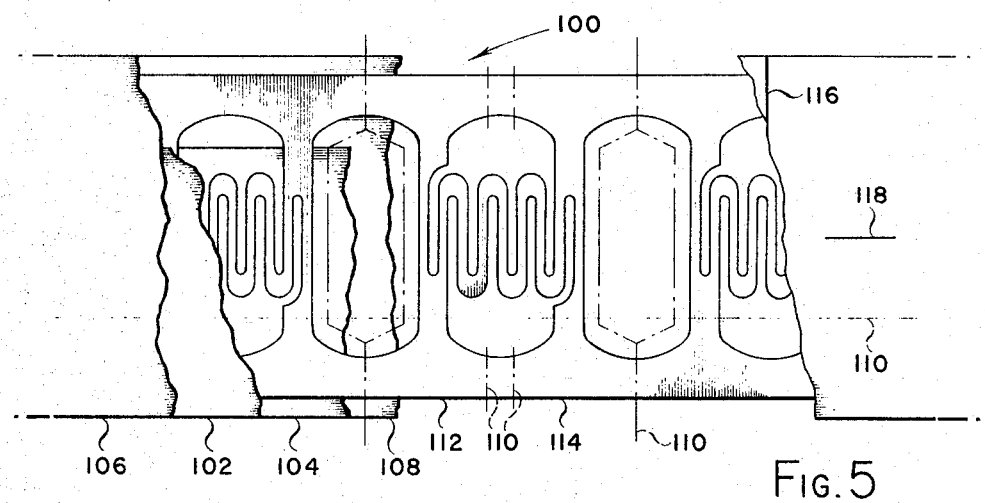
FIGURE 5 is a cutaway view of a continuous gauge assembly showing a series of gauges fabricated in accordance with the process of the invention.

The product of the present invention generally comprises a sensing element which, with the exception of electrical leads therefrom, is imbedded within a matrix of a nonflowing adhesive or adhesive composition capable of being bonded to an article, removable protective backings being adhered to the sides of the adhesive such that they may be easily stripped therefrom during or preliminary to installation procedures. During installation the backing on a surface of the matrix is removed. The exposed surface of this matrix is then pressed against a surface which is intended to receive the sensing element, and the adhesive is caused to bond to the surface.

The process whereby the gauges are produced is preferably continuous in nature to effectively reduce production cost.

In greater detail, FIGURE 1 illustrates a measuring instrument which may be either a strain gauge or a resistance surface thermometer. However, as discussed hereafter, while either type of gauge is intended to be covered, reference will be made primarily to strain gauges. The integrated assembly 10 of FIGURE 1 comprises a gauge element 11 which may be of a leaf-foil, wire or other configuration, such items being well-known in the art and commercially available. The element may be of an electrical resistance type material or of a semi-conductive material. Integrally attached to and extending from the gauge element 11 is a pair of electrical leads or tabs 12. The gauge element 11 is imbedded within a matrix of partially polymerized adhesive 13 such that at least a portion of the tabs protrude therefrom; preferably, in a manner to cause the rest of the gauge element to be hermetically sealed therein. Firmly adhered to either side of the adhesive matrix 13 is a pair of protective backing strips 14 and 15.

The adhesive matrix utilized is of major importance with respect to this invention. The matrix should be composed of a nonflowing adhesive or adhesive composition capable of being bonded on an article. Preferably this matrix should be of such a character as to be tacky or such a character as to be capable of being made tacky so that during the use it is capable of adhering to the surface of an article after one of the backing strips 14 or 15 is removed from it, and should be of such a character that it is then capable of being further treated, caused or allowed to form a firm adhesive bond with the surface of such an article.

Such adhesion can be accomplished with adhesive compositions capable of being used with the present invention by the presence of curing agents in the matrix, by the application of heat (including ambient heat) to the matrix, by the application of pressure (other than the small amount of pressure holding the matrix in place), by the application of curing agents to the matrix either before or after location of the matrix in a final position against a surface, by the vaporization of an inner solvent from the matrix or by a combination of these various methods.

From the preceding it will be realized that the matrix 13 may be composed of a wide variety of either flexible or rigid adhesives for use. Various suitable adhesives for use with this invention fall into a number of different known categories. Such adhesives are well-known at the present time and are discussed in chapters 14 through 35 of the text "Handbook of Adhesives," edited by Skeist, Reinhold Publishing Corporation, New York, N.Y., copyright 1962.

From an examination of this text it will be apparent that various epoxy and modified epoxy adhesives can be used. It will also be apparent that a wide variety of natural and synthetic rubber adhesives, polysulphide adhesives, phenolic adhesives, resorcinol adhesives, amide adhesives, isocyamate based adhesives such as the well-known polyurethanes, polyamide adhesives and vinyl and vinyl derivative adhesives may be used with this invention. Various modified adhesives based upon any of these "basic" classes of adhesives can be employed.

For most applications it is preferred that such adhesives be capable of being cured or polymerized to a rigid system or structure, but it is also possible to utilize with this invention adhesive compositions which when in their final state are somewhat flexible and resilient. Such adhesive compositions may contain minor amounts of plasticizers, curing agents and fillers. As a general rule however, the presence of such fillers is to be avoided since they tend to increase the dimensions of a matrix such as the matrix 13.

Particularly favorable results with the present invention can be achieved with so-called "B-stage" adhesive compositions. These B-stage compositions are resins in which various ingredients have reacted to an intermediate stage. B-stage compositions of this category will normally tend to soften when heated, and swell in contact with certain liquids, but will not entirely fuse or dissolve. They are capable of being further cured or polymerized so as to form a bond. B-stage resins of the epoxy type which are particularly favorable for use with this invention because of their ability to form strong adhesive bonds and because they can be easily handled in creating measuring devices of this invention. Polyester, phenolic and silicone adhesives are capable of being used in the so-called B-stage. If such resins are not tacky in a matrix such as matrix 13 they can be frequently made tacky by having a small quantity of an activating agent such as a peroxide or an amine for causing polymerization after a backing strip such as the strip 14 or 15 is removed.

From a consideration of the preceding those skilled in the art of adhesives will realize that the particular material or adhesive composition chosen for a matrix such as the matrix 13 should be chosen primarily with reference to its physical as opposed to its mechanical properties. It will also be realized that such an adhesive can be formulated in accordance with known techniques so as to have various specific properties as desired in order to facilitate the manufacture and use of devices as herein described. Generally speaking as wide a range of operative temperatures is desired for an adhesive for use with the present invention as possible.

It is sometimes desirable to utilize a supported matrix wherein a reinforcing means or screen of threads 16 (FIGURE 1) is imbedded within the adhesive matrix 13. Such screen is usually comprised of widely spaced, woven glass cloth threads. When so utilized the threads making up the screen act as shims or spacers which prevent the sensing element from contacting and grounding against the adherend surface during or after the application of the gauge and additionally prevent the adhesive from being squeezed outward under the application of required bonding pressures. The screen also aids in controlling the adhesive to a uniform thickness. Screens are particularly desirable when used with epoxyphenolic type adhesives, or other adhesives which are applied in a relatively fluid consistency and which normally require higher application pressures than do some other types of adhesives. Under certain conditions it is preferable that the screen be positioned within the matrix at as great a distance from the sensing element as possible and opposite the side intended for application to this adherent surface to prevent sensing element distortion.

Both supported and unsupported adhesive matrices may be supplied in a variety of thicknesses. The main requirement in this respect is that the thickness be a practical one for accomplishing the transfer of the measuring function. The sensitivity of the particular gauge is required for its intended application is one controlling factor here. A total thickness of the gauge assembly (thickness $t$ in FIGURE 1) of approximately 1 mil has been found to be acceptable. Since the foil thickness is about .000100" to .000250", very thin assembly may be achieved, in the unsupported gauge, by applying layers of adhesive approximating .000500" on either side of the element. Greater structural integrity of the assembly can be achieved without excessive sensitivity loss by providing a thicker adhesive matrix, particularly on the side of the gauge opposite the side to be adhered to the measurement surface. For example, a .5 mil thickness of adhesive is sometimes provided on each side of the gauge element, a reinforcing grid of about 1 mil thickness being placed on the side opposite the side to be affixed to the adherend surface, another layer of adhesive of .5 to 1 mil thickness being applied over the grid, thus providing a total thickness of approximately 3 to 3.5 mils. Gauge assemblies having total thicknesses up to and beyond 8 mils have been found to provide usable readings. An adhesive layer of minimum thickness is usually maintained between the gauge element and the surface to be affixed, thereby maximizing sensitivity characteristics.

From a consideration of the various different adhesives capable of being used with this invention it will be realized that an adhesive bond as required during use of a device as described can be created in various different ways, and that such ways will depend upon the specific character of the adhesive composition used. Because virtually all adhesives which are partially polymerized tend to further polymerize because of the heat derived from ambient conditions it is generally preferred to store a device as herein indicated at a relatively low temperature such as a temperature not to exceed 40° F. prior to its use.

It is generally desirable that the backing strips 14 and 15 employed be of an impervious character and that they be firmly adhered to the matrix surfaces as by the tacky character of the matrix material in order that air contact with the matrix be reduced to as great an extent as possible. If desired these backing strips 14 and 15 can be coated with a release agent such as a thin layer of silicon grease or a layer of a polyolefin such as polyethylene so as to lower their ability to transmit air and so as to improve the ease with which they may be released from a matrix. Thus, for example, it is possible to use with the present invention as backing strips 14 and 15 so called slip sheets such as are commonly employed for release purposes in the decal field. Various other materials such as thin sheets of polyethylene or the like can be used.

A portion of the adhesive matrix is sometimes extended to the extremities of the tabs 12 (FIGURE 1). As illustrated, a portion 17 of the matrix 13 extends to the end of a tab 12, but only on the side of the tab nearest the adherend surface. Thus, the thin and fragile tab 12 is supported over its extremity by the matrix portion 17, one of its surfaces is exposed to facilitate the attachment of an electrical lead. The tabs may be gently lifted from their supported position as necessary to accomplish welded lead attachment.

FIGURE 2 shows the gauge assembly 10 as finally affixed to a structure 18 with respect to which strain or temperature is to be measured. Lead wires 19 and 20 have been soldered or otherwise affixed to the leads 12 for the transmittal of signals to appropriate amplifying and indicating means.

In so affixing the gauge it is usual to first prepare the adherend surface by cleaning and degreasing it in the usual manner to expose the clean, bare metal. Best results are achieved with an extremely smooth surface. It is therefore preferable that the surface not be roughened. Indeed, the smoother the surface, the better the bond since the molecular contacts at the surface are more intimate and the number of chemical links formed are increased. The backing strip 15 is then carefully removed from the matrix surface and the surface, if not already tacky, is subjected to the application of a suitable activating agent and pressed gently against the clean adherend surface in a predetermined orientation using orientation lines 9 for proper location. A relatively light pressure and a controlled low heat are then applied to the gauge with the upper backing strip 14 still intact. The gauge proper is thereby protected during the installation procedure against possible injury from pressure pads, weights or clamps.

The precise curing conditions will, as indicated, vary depending upon the nature of the material from which a matrix 13 is created. If the matrix is manufactured from an epoxy modified polyamide adhesive such as the adhesive Metlbond 406 manufactured by Narmco, Materials Division, Telecomputing Corporation, Costa Mesa, California, the matrix may be cured by applying a temperature of from 325 to 350° F. to it for a period of about 15 minutes while applying a pressure from about 3 to 5 p.s.i. to the matrix so as to hold it in place. This adhesive is well-known and it is readily obtainable from the manufacturer indicated. The nature of this particular adhesive is indicated in the aforegoing Skeist text. The temperatures, pressures and times required for such curing are of course related. In general the higher the pressure or the higher the temperature the less time required.

As a further example of the present invention the matrix 13 may be formed of the well-known epoxy phenolic modified adhesive known as Meltbond 302A manufactured by the firm noted in the preceding paragraph. The character of this type of adhesive is well-known as may be shown by reference to the Skeist text cited; this adhesive is readily obtainable from its manufacturer. When this adhesive is used for the matrix 13, temperatures from about 250 to 350° F. serve to create a final bonded structure desired when pressures from 3 to 5 p.s.i. are applied in about 30 minutes time.

Other adhesives may of course be employed in practicing the invention. When such adhesive composition is a polyurethane as specified in detail in example one on page 337 of the aforenoted Skeist text, a relatively brief exposure to air after removal of a sheet 14 or 15 as described acts so as to activate the methane, enabling a tough bond to be achieved upon application to a surface. It is to be noted that this urethane adhesive is of a somewhat flexible character whereas the adhesives noted in the preceding are of a flexible character.

Once the adhesive is cured the outer backing strip is removed. This procedural sequence results in a loosening of the backing during the curing cycle and substantially eliminates the possibility of destructive effect to the gauge during backing removal. The gauge, so applied, includes superior detection capabilities and, at least as to the gauge proper, is waterproof.

Two procedures for fabricating gauges according to this invention are presented. Each method, with minor variation, may be practiced in either a continuous and automatic manner or as a discrete manufacturing process.

As illustrated in FIGURE 3, a continuous belt 22 accepts the components of the gauge assembly in a typical fabrication procedure as it moves from left to right. A backing strip 24 is fed from a roller 26 onto the surface of the belt around an idler roller 28. A suitable adhesive 30 of relatively viscous consistency is sprayed from a spray means 32 in an even layer of predetermined thickness over the exposed surface of the backing strip 24. A strip of interconnected gauge elements 34 is then fed from a source 36 onto the layer of adhesive 30 and firmly positioned thereon by an idler roller 38. Typical gauge strips are illustrated in FIGURES 5–8. Next, a second layer of adhesive 42 of controlled thickness is applied over the gauge strip 34 so as to embed or encapsulate the elements.

Where reinforced gauges are to be fabricated, a strip of reinforcing material 44 is next fed from a roll 46, over idler 48 and onto the second adhesive layer 40 and is itself thereafter embedded through the application of a third layer of adhesive 50 sprayed in controlled thickness from a source 52. The continuous assembly is then completed by applying a second backing strip 54 over the surface of the third adhesive layer 50 by feeding it over an idler 56 from a source 58. A cutter means 60 is provided to trim and sever the gauge elements into strips or individual assemblies.

When reinforcement is not needed, the reinforcement and third adhesive layer steps are omitted. It will also be understood that the various layers of adhesive are integrated as the process progresses, so as to completely encapsulate the gauge elements. A representatively illustrated guide means 62 is sometimes provided to prevent the adhesive from covering the electrical connection tabs of the sensing elements. The belt 22 and/or various idler rollers may be heated to facilitate partial polymerization of the adhesive. Alternative heat sources may also be provided as required.

Figure 6:
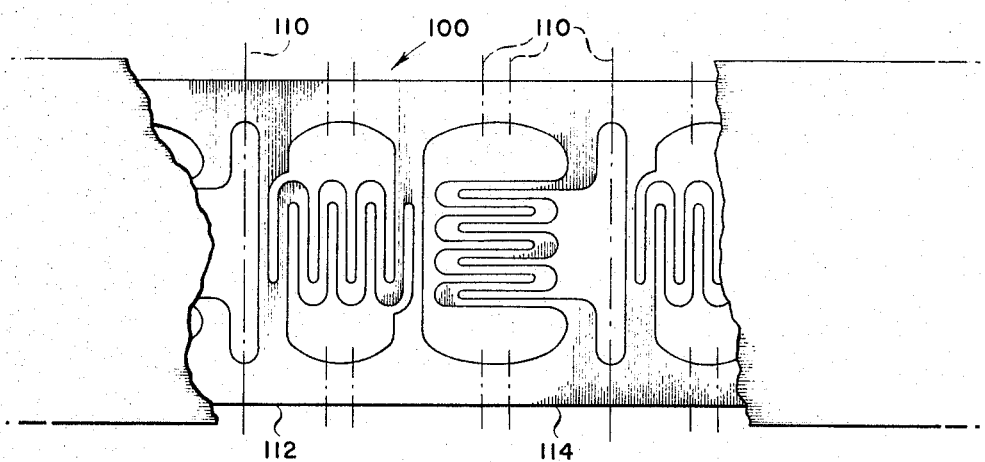
FIGURES 6–8 are respectively illustrations of 90°, 120° and 4-gauge bridge arrangements of foil gauge elements sometimes utilized in the invention.
Figure 7:
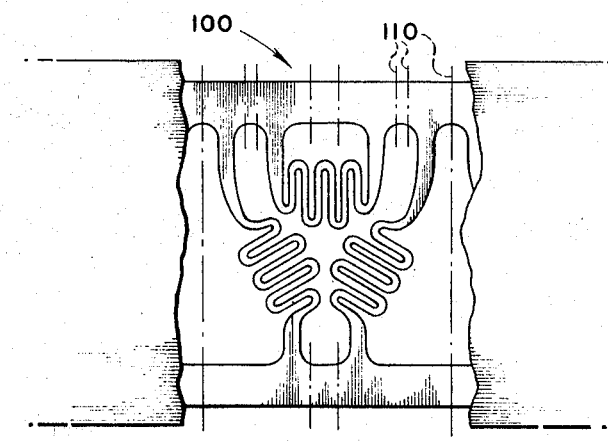
Figure 8:
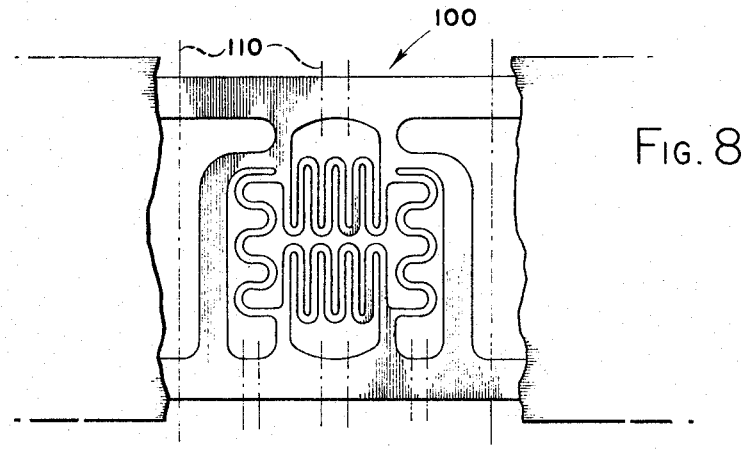

A second fabrication method is schematically illustrated in FIGURE 4. Therein, a continuous strip of gauge elements 64, for example, in the nature of those illustrated in FIGURES 6–8, are fed from a roller 66 through a pair of idler rollers 68 and 70. Simultaneously, two strips of partially polymerized adhesive tape 72 and 74 of predetermined thickness are fed from supply spools 76 and 78 and between the idlers 68 and 70 so as to cover both sides of the element strips in an encapsulating relationship. As the elements are encapsulated they are passed between a second pair of idler rollers 80 and 82, a strip of reinforcing material 84 is fed onto one surface from a spool 86. A third tape 88 is then drawn from a spool 90 and applied over the reinforcement 84, its travel being guided by idler rollers 92 and 94. The various idler rollers serve to compress the components into an integrated assembly. If necessary, they may be heated to further polymerize the adhesive. A cutter 96 may also be provided to operate in conjunction with a roller 98 to sever the elements.

Variations of these procedures may be made without departing from the intended scope of the invention. For example, the tapes of the FIGURE 4 method may be applied in place of the spray procedures of the FIGURE 3 method. Additionally, only the fundamental procedural steps are presented. It will be apparent that further detailed procedures may be introduced within the inventive concept.

The illustration of FIGURE 5 shows a typical, non-reinforced, continuous strip of foil-type gauge assemblies fabricated in accordance with the present invention. It specifically illustrates a strip type gauge element series particularly adaptable to this invention. The element strip 100 is embedded between adhesive layers 102 and 104 and backed by backing strips 106 and 108.

The various gauge portions may either be severed and packaged individually or they may be shipped as a continuous strip or roll thereof and severed by operational personnel as needed. A simple pair of shears is adequate for this purpose. Appropriate shear lines are representatively illustrated by the numeral 110. These are sometimes marked on the exterior of the backing strips 106 and 108. The adhesive layers 102 and 104 are, as shown in FIGURE 5, usually terminating intermediate the width of the assembly to expose the electrical connector tabs 112 and 114. Orientation marks such as those indicated at 116 and 118 normally imprinted on the backing to facilitate proper location.

FIGURES 6–8 illustrate three alternative gauge element embodiments which are readily adaptable for utilization in the present invention. The figures respectively illustrate a 90° rosette gauge (FIGURE 6), a 120° rosette gauge (FIGURE 7), and a 4-gauge, double Poisson arrangement (FIGURE 8). In each case representative shear lines are shown, the numeral 110 being used to identify them. Tabs for electrical connection are provided upon either or both sides of the assemblies between the shear lines, no numerals being provided for their designation. For example, each element in the rosette of FIGURE 7 has a tab connected to each of its ends and the bridge-type rosette of FIGURE 8 has at least one tab connected to each of its corners.

The sensing element, as embedded in a homogenous adhesive matrix in the manner taught herein, permits the user to bond it to the test specimen as an integral assembly. That the homogeneity of the matrix gauge is significant can be seen readily from the following. Assuming that all other components in a gauge have been properly selected (i.e. all other gauge properties being optimum) the adhesive will affect and determine these gauge properties: (1) grid gage factor; (2) gauge factor vs. temperature; (3) linearity; (4) hysteresis; (5) apparent strain (zero shift vs. temperature); (6) drift (zero shift vs. time under zero strain); and (7) creep (zero shift vs. time under strain).

Figure 9:
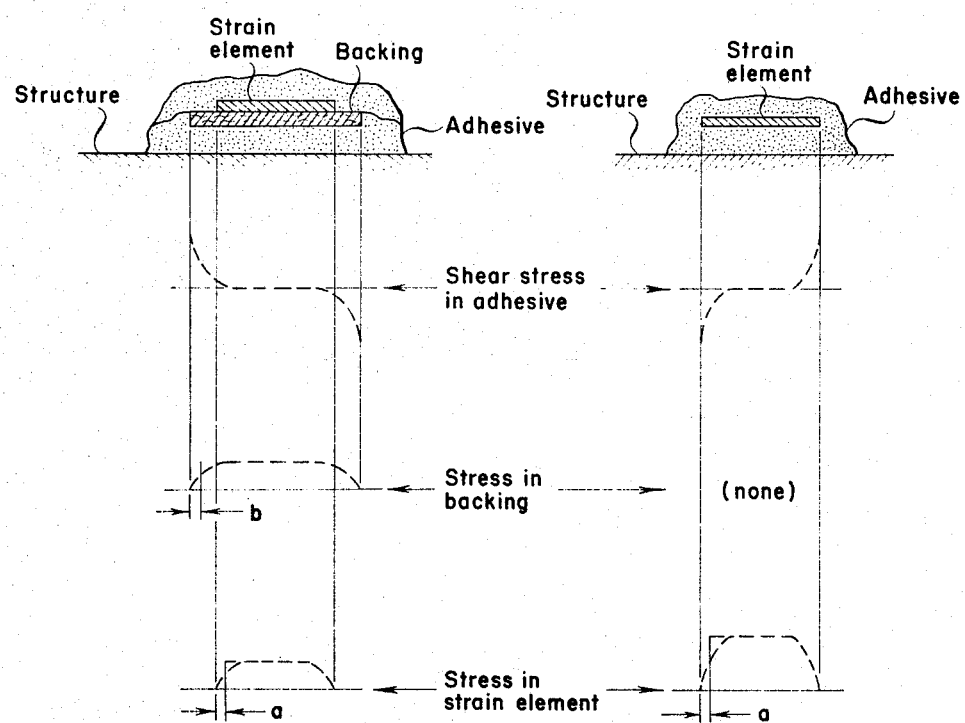
FIGURE 9 is a graph illustrating the qualitative comparison of standard backed strain gauges to the matrix gauge of the present invention insofar as strain transfer from structure surface to strain elements is concerned.

The major effect on the grid gauge factor of the homogeneous matrix gauge of the present invention vs. a standard backed gauge is illustrated in FIGURE 9. In all cases of standard bonded gauges, the surface strains are transmitted from the structure surface to the adhesive layer. The deformation of the adhesive is introduced by the action of shear forces near the ends of the adhesive layer. The shear forces diminsh from a maximum near the ends to zero at a point a small distance inward from the ends. Between the zero shear points the layer is under a state of plane stress. From this it is seen that as the strain distribution in the element follows that in the adhesive, it is not uniform along its entire length even though the strain in the structure beneath it may be uniform. These nonuniform strains are resisted by reacting forces of the element embedded within the adhesive. As a result, small segments at the ends of the embedded gauge element are subjected to greatly attenuated strain which build gradually to a constant maximum at some distance in from the ends. In the standard back gauge the nonuniform strains are further modified in respect to levels transmitted by the backing. This is attributable to material constants of the backing differing from those of the adhesive as well as the contribution of the backing geometry. With materials currently used, it is almost a certainty that the elastic moduli of the backing will be greater than those of the adhesive, thus considerably reducing the strain levels ultimately transmitted to the sensor elements.

The gauge factor is usually stated as:

$$G.F. = \frac{\Delta R/R}{\Delta L/L}$$

where R and L are respectively the unstrained values of resistance and length. However, the $\Delta L/L$ is in fact a measure of specimen surface strain and not gauge element strain, usually determined by optical extensometer measurement of calculated on the basis of measured force and/or deflections on specimens of known geometry. It can be seen that since gauge factor is a function of the strain transmitted to the sensor grid and related to its change in resistance, a portion of the element, $2a$, is only partially effective, thereby reducing gauge factor by $2a/L$ and in the case of the backed gauge is further reduced by an ineffective portion of the backing equivalent to $2b/L$, so that a more precise statement of gauge factor for backed gauges becomes $$G.F. = \frac{\Delta R/R}{\Delta L/L}\left[1 - \frac{2(a+b)}{L}\right]$$

In the case of the homogeneous matrix gauge, it can be seen that the gauge factor reductions are minimized by eliminating the portion contributed by a backing. For this case a closer approximation of gauge factor may be stated as $$G.F. = \frac{\Delta R/R}{\Delta L/L}\left[1 - \frac{2a}{L}\right]$$

Hysteresis, linearity, apparent strain, drift and creep are also improved in the matrix gauge since variables contributed by material properties inherent in non-homogenous matrices are eliminated and such contributions are limited to those of the more simple form of bonded gauge, i.e., the sensor element and an adhesive.

An additional attribute of the matrix gauge is the ease with which multiple arrangement sensing elements may be made affording rosette capability and two or four leg bridge arrangements for increased outputs and control of stability when subjected to elevated temperatures.

While specific embodiments of the invention have been shown and described herein it should be understood that certain alterations, modifications and substitutions may be made to the instrument disclosure without departing from the spirit or scope of the invention as defined by the appended claims.

I claim:
1. An electrical strain measuring device capable of being pressed onto a receiving surface, comprising
   a sheet of polymerizable adhesive polymerized to a B-stage cure, at least one surface of said sheet having the characteristic of being adhesively bonded to said receiving surface upon substantial completion of polymerization of said adhesive;
   an impermeable backing strip, in contact with, and extending over said one surface of said sheet;
   a planarly disposed strain-responsive sensing conductor, coplanarly encapsulated within said sheet, the resistance of said sensing conductor being responsive to strain transmitted from said receiving surface through said polymerized adhesive; and
   a pair of lead conductors each having a first end connected to a corresponding terminus of said sensing conductor and a second end extending through, and beyond, a boundary of said sheet.
2. An electrical strain measuring device as defined in claim 1, including a protective backing strip, in contact with, and extending over the surface of said sheet opposite said one surface.
3. An electrical strain measuring device as defined in claim 1, wherein said sensing conductor comprises a thin, continuous wire.
4. An electrical strain measuring device as defined in claim 1, wherein said sensing conductor comprises a thin, electrically conductive metal foil.
5. An electrical measuring device as defined in claim 1, wherein said adhesive is selected from the group comprising:
   epoxy-polyamide adhesive, epoxy-phenolic adhesive, rubber adhesive, polysulfide adhesive, phenolic adhesive, resorcinal adhesive, polyamide adhesive, isocyanate adhesive, polyester adhesive, polyurethane adhesive, and vinyl adhesive.

6. A measuring device as defined in claim 1, including a nonmetallic reinforcing screen coplanarly disposed in said matrix on one side of said sensing conductor.

References Cited by the Examiner

UNITED STATES PATENTS

| | | | |
|---|---|---|---|
| 2,350,073 | 5/1944 | Simmons | 338—2 |
| 2,394,130 | 2/1946 | Woodman | 338—255 |
| 2,428,012 | 9/1947 | Collins et al. | 338—2 |
| 2,457,616 | 12/1948 | Van Dyke et al. | 338—2 |
| 2,739,371 | 3/1956 | Grisdale et al. | 29—155.57 |
| 2,745,942 | 5/1956 | Cohen | 338—255 X |
| 2,812,409 | 11/1957 | Jones et al. | 338—2 |
| 2,870,277 | 1/1959 | Carter | 338—255 X |
| 2,900,290 | 8/1959 | Bethge | 338—255 X |
| 2,916,403 | 12/1959 | Calderwood | 117—128.4 |
| 2,927,878 | 3/1960 | Beckman | 154—90 |
| 2,992,317 | 7/1961 | Hoffman | 219—202 |
| 3,026,604 | 3/1962 | Boggs | 338—2 X |
| 3,029,303 | 4/1962 | Severino. | |
| 3,038,831 | 6/1962 | Rosenberg | 117—232 X |
| 3,082,139 | 3/1963 | Clark | 156—153 |
| 3,121,068 | 2/1964 | Baum | 260—27 X |
| 3,156,813 | 11/1964 | Trainor | 219—526 |
| 3,191,005 | 6/1965 | Cox. | |

ANTHONY BARTIS, *Acting Primary Examiner.*

RICHARD M. WOOD, *Examiner.*

H. T. POWELL, W. D. BROOKS, *Assistant Examiners.*